(12) United States Patent
Takeoka (10) Patent No.: US 8,995,110 B2
(45) Date of Patent: Mar. 31, 2015

(54) LAMINATED CERAMIC CAPACITOR (75) Inventor: Shinsuke Takeoka, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 236 days.

(21) Appl. No.: 13/876,451

(22) PCT Filed: Sep. 26, 2011

(86) PCT No.: PCT/JP2011/071786
§ 371 (c)(1),
(2), (4) Date: Apr. 17, 2013

(87) PCT Pub. No.: WO2012/043427
PCT Pub. Date: Apr. 5, 2012

(65) Prior Publication Data
US 2013/0201602 A1 Aug. 8, 2013

(30) Foreign Application Priority Data

Oct. 1, 2010 (JP) ................................. 2010-224221

(51) Int. Cl.
*H01G 4/06* (2006.01)
*H01G 4/228* (2006.01)
(Continued)

(52) U.S. Cl.
CPC .......... *H01G 4/12* (2013.01); *B32B 18/00* (2013.01); *C04B 35/486* (2013.01);
(Continued)

(58) Field of Classification Search
CPC ............ H01G 4/018; H01G 4/06; H01G 4/12; H01G 4/1209; H01G 4/1236
USPC .......................... 361/301.4, 311, 321.1, 321.5
See application file for complete search history.

(56) References Cited

U.S. PATENT DOCUMENTS 5,204,301 A 4/1993 Ohkubo et al.
6,487,065 B1 * 11/2002 Nishino et al. ............. 361/321.2
(Continued)

FOREIGN PATENT DOCUMENTS

JP H05-217426 A1 8/1993
JP H11-106259 A 4/1999
(Continued)

OTHER PUBLICATIONS

Notification of Reasons for Refusal issued by the Japanese Patent Office, mailed Sep. 3, 2013, for Japanese counterpart application No. 2012-536419.

*Primary Examiner* — Jenny L Wagner
*Assistant Examiner* — Dion R Ferguson
(74) *Attorney, Agent, or Firm* — Law Office of Katsuhiro Arai (57) ABSTRACT

A laminated ceramic capacitor includes multiple dielectric layers, internal electrodes having Cu as the primary component and embedded between the dielectric layers, and external electrodes. The dielectric layers contain a primary component comprised of a $CaZrO_3$ compound and auxiliary components that include Mn, B, Si, and Li wherein a primary phase comprised of the primary component, segregation phases containing Ca and at least one of the auxiliary components, and secondary phases containing at last Ca and Zr are formed. The ratio of Ca to Zr in the secondary phases is smaller than the ratio of Ca to Zr in the primary phase, and the number of secondary phases with a diameter of 100 nm or greater in a cross section of the dielectric layers averages 30 or less per 10 square μm.

17 Claims, 2 Drawing Sheets

(51) Int. Cl.
　　*H01G 4/12*　　　　(2006.01)
　　*B32B 18/00*　　　　(2006.01)
　　*C04B 35/486*　　　(2006.01)
　　*C04B 35/626*　　　(2006.01)
　　*H01G 4/30*　　　　(2006.01)

(52) U.S. Cl.
　　CPC .. *C04B 35/62675* (2013.01); *C04B 2235/3203* (2013.01); *C04B 2235/3206* (2013.01); *C04B 2235/3208* (2013.01); *C04B 2235/3248* (2013.01); *C04B 2235/3267* (2013.01); *C04B 2235/3409* (2013.01); *C04B 2235/3418* (2013.01); *C04B 2235/442* (2013.01); *C04B 2235/656* (2013.01); *C04B 2235/6562* (2013.01); *C04B 2235/6582* (2013.01); *C04B 2235/78* (2013.01); *C04B 2235/79* (2013.01); *C04B 2235/80* (2013.01); *C04B 2235/85* (2013.01); *C04B 2237/348* (2013.01); *H01G 4/1236* (2013.01); *H01G 4/30* (2013.01)

USPC ............... 361/321.5; 361/301.4; 361/311; 361/321.1; 361/321.2

(56) References Cited

U.S. PATENT DOCUMENTS

| 7,342,767 | B2 | 3/2008 | Naito et al. |
| 2005/0128683 | A1 | 6/2005 | Watanabe et al. |
| 2009/0046410 | A1 | 2/2009 | Takeoka |
| 2009/0219666 | A1* | 9/2009 | Fukuda ............... 361/301.4 |

FOREIGN PATENT DOCUMENTS

| JP | 2005-154237 A | 6/2005 |
| JP | 2009-007209 A | 1/2009 |
| JP | 4345071 B2 | 10/2009 |
| WO | 2012053316 A1 | 4/2012 |
| WO | 2012120712 A1 | 9/2012 |

* cited by examiner

LAMINATED CERAMIC CAPACITOR

This application is the U.S. National Phase under 35 U.S.C. §371 of International Application PCT/JP2011/071786, filed Sep. 26, 2011, which claims priority to Japanese Patent Application No. 2010-22422, filed Oct. 1, 2010. The International Application was published under PCT Article 21(2) in a language other than English.

TECHNICAL FIELD

The present invention relates to a laminated ceramic capacitor using a dielectric porcelain composition whose primary component is a $CaZrO_3$ compound, a laminated ceramic capacitor using internal electrodes whose primary component is Cu, and a method of manufacturing such laminated ceramic capacitor.

BACKGROUND ART

Dielectric porcelains whose primary component is $CaZrO_3$ have traditionally been used for high-frequency dielectric resonators, filters, laminated ceramic capacitors, etc. Desirably these laminated ceramic capacitors, etc., offer lower temperature coefficient of dielectric constant in order to support recent devices operating at higher frequencies (approx. 100 MHz to 2 GHz). For the internal electrodes of laminated ceramic capacitors, base metals of low specific resistance must be selected in order to ensure low ESR (equivalent series resistance), small loss in the high-frequency range (high Q-value), and low cost, and for this reason Cu is used instead of Ni or Pd. Requirements for the dielectrics include high Q-value, low temperature coefficient of dielectric constant, and high reliability, and, in relation to the use of Cu in internal electrodes, possibility to be sintered at low temperatures of 1080° C. or below, and being a non-reducing material in order to prevent oxidization of Cu. Also for environmental reasons, dielectrics free of Pb and Bi are desired. Dielectric porcelain compositions meeting these requirements are already known, and applications of these dielectric porcelain compositions for laminated ceramic capacitors are described in multiple patent literatures.

For example, Patent Literature 1 describes a non-reducing dielectric porcelain composition that contains $(Ca_{1-x}Sr_x)_m(Zr_{1-y}Ti_y)O_{3-z}MnO_{2-w}$ $SiO_2$ as its primary component and $a(LiO_{1/2}$—$RO)$—$(1-a)(BO_{3/2}$—$SiO_2)$ as an additive (where RO represents at least one of SrO, BaO and CaO), where this non-reducing dielectric porcelain composition "can provide a dielectric porcelain which can be sintered at low temperatures of approx. 1000° C. or below, thereby permitting use of copper as the electrode material, which also offers high Q-value and dielectric constant and stable temperature characteristics of dielectric constant" (Paragraph [0005]). However, how this composition can improve the longevity traits of laminated ceramic capacitors using Cu in internal electrodes has not been studied sufficiently.

Also, Patent Literature 2 describes a dielectric porcelain composition that contains a complex oxide expressed by $(CaO)_x(Zr_{1-y}Ti_y)O_2$, Mn compound, and glass component expressed by $(aLi_2O\text{-}bB_2O_3\text{-}cCaO)$, characterized in that "this dielectric porcelain composition can be sintered in a reducing ambience of 1000° C. or below, offers high dielectric constant and stable temperature characteristics of dielectric constant, and achieves significant improvement of Q-value, particularly in the high-frequency range (GHz band), by achieving Qf=10000 or more in the high-frequency range" (Paragraph [0015]). However, how this composition can improve the longevity traits of laminated ceramic capacitors using Cu in internal electrodes is not studied sufficiently.

On the other hand, Patent Literature 3 refers to the longevity traits of laminated ceramic capacitors, as well, describing a dielectric porcelain composition comprising: a primary component that contains a dielectric oxide expressed by the composition formula $\{(Ca_{1-x}Me_x)O\}_m(Zr_{1-y}Ti_y)O_2$, where the symbol Me indicating an element name in this composition formula is at least one of Sr, Mg and Ba and the symbols m, x and y indicating composition mol ratios in the composition formula meet the relationships of $0.8 \le m \le 1.3$, $0 \le x \le 1.00$ and $0 \le y \le 1.00$, respectively; a first auxiliary component that contains a V oxide; a second auxiliary component that contains an Al oxide; a third auxiliary component that contains a Mn oxide; and a fourth auxiliary component whose primary component is $SiO_2$ and which also contains at least one type of oxide selected from the group that includes MO (where M is at least one type of element selected from the group that includes Ba, Ca, Sr and Mg), $Li_2O$ and $B_2O_3$, where the ratio of each auxiliary component relative to 100 mol of the primary component is 0 mol<first auxiliary component<7 mol for the first auxiliary component (equivalent values of the V oxide being $V_2O_5$), 0 mol<second auxiliary component<15 mol for the second auxiliary component (equivalent values of the Al oxide being $Al_2O_3$), 0 mol<third auxiliary component<5 mol for the third auxiliary component (equivalent values of the Mn element in the Mn oxide), and 0 mol<fourth auxiliary component<20 mol for the fourth auxiliary component (equivalent values of the oxide); wherein a method of manufacturing such dielectric porcelain composition comprises: a step to prepare a pre-reaction material by mixing some of the auxiliary component materials excluding at least the third auxiliary component material or fourth auxiliary component material or both, with a starting material prepared to obtain a primary component material; a step to cause the prepared pre-reaction material to react to obtain a reacted material; and a step to mix into the obtained reacted material the auxiliary component material(s) excluded when the pre-reaction material was prepared to obtain a dielectric porcelain composition material, where such manufacturing method is characterized as being able to "manufacture a reduction-resistant dielectric porcelain composition offering excellent low-frequency dielectric characteristics and greater longevity under stress in terms of insulation resistance" (Paragraph [0013]). However, particularly desired sintering temperatures described as 1200 to 1300° C. or low-temperature sintering to permit use of Cu in internal electrodes is not sufficiently studied.

Patent Literature 4 describes a laminated ceramic capacitor whose primary component is a $CaZrO_3$ compound and which also has a ceramic body containing Mn or other additive, characterized in that such laminated ceramic capacitor can offer improved longevity traits when segregation deposit of Mn—Cu—O is suppressed in a cross-section of the ceramic body.

In light of the aforementioned situation, the inventors of the present invention studied ways to improve the longevity traits of laminated ceramic capacitors using Cu in internal electrodes and found that the Ca/Zr ratio and Mn, Li, B and Si contents of the $CaZrO_3$ dielectric porcelain in such laminated ceramic capacitor would determine the longevity of the laminated ceramic capacitor and also found conditions for Ca/Zr ratio and Li—B—Si composition ratio that would give a denser $CaZrO_3$ dielectric porcelain at the Cu melting point of 1080° C. or below, even when the contents of Li and B are suppressed so as not to cause the longevity to drop, to permit use of Cu in internal electrodes (Patent Literature 5).

BACKGROUND ART LITERATURES

Patent Literatures

Patent Literature 1: Japanese Patent Laid-open No. Hei 5-217426
Patent Literature 2: Japanese Patent Laid-open No. Hei 11-106259
Patent Literature 3: Japanese Patent Laid-open No. 2005-154237
Patent Literature 4: Japanese Patent No. 4345071
Patent Literature 5: Japanese Patent Laid-open No. 2009-7209

SUMMARY OF THE INVENTION

Problems to Be Solved by the Invention

The invention described in Patent Literature 5 above is for using a dielectric porcelain composition expressed by $Ca_xZrO_3+aMn+bLi+cB+dSi$, characterized in that such dielectric porcelain composition contains a by $0.5 \leq a \leq 4.0$ mol and b, c and d by $6.0 \leq (b+c+d) \leq 15.0$ mol relative to 10 mol of $Ca_xZrO_3$ (where $1.00 \leq x \leq 1.10$) while meeting $0.15 \leq (b/(c+d)) \leq 0.55$ and $0.20 \leq (d/c) \leq 3.30$, to improve the longevity traits of laminated ceramic capacitors whose internal electrodes use a metal whose primary component is Cu.

However, the inventors of the present invention discovered, after studying persistently in earnest, that the longevity traits of laminated ceramic capacitors using such dielectric porcelain composition could be improved further. In other words, the object of the present invention is to provide a laminated ceramic capacitor using Cu in internal electrodes that offers low relative dielectric constant and temperature coefficient of capacitance as well as excellent longevity traits, wherein such laminated ceramic capacitor uses a dielectric porcelain whose primary component is the aforementioned $CaZrO_3$ for further improvement of longevity traits after being sintered at 1000° C. or below, as well as a method of manufacturing such laminated ceramic capacitor.

Means for Solving the Problems

The inventors of the present invention studied ways to further improve the longevity of a laminated ceramic capacitor whose primary component is a $CaZrO_3$ compound and which uses Cu in internal electrodes, after sintering at or below 1080° C. being the melting point of its Cu internal electrodes, or more desirably after sintering at a low temperature of 1030° C. or below, and discovered that, in the case of a system to which Si, B, Li, etc., are added as auxiliary components of the dielectric composition, Ca (alkali earth metal) would elute, during the course of sintering, from the primary component or $CaZrO_3$ compound to the liquid phase which is likely formed by Si, B, Li, etc., added as auxiliary components, thereby generating secondary phases in which excessive Zr is present, and this would contribute to the deterioration of longevity traits. Particularly when a small amount of Mn, or specifically 5.0 mol or less, is added, presence of these secondary phases in which excessive Zr is present affects the longevity traits more than presence of the segregation deposit of Mn—Cu—O as described in Patent Literature 4. In other words, the present invention is based on the finding that, by suppressing the abundance of the secondary phases (secondary phases containing more Zr than the aforementioned primary component), the longevity traits could be improved while keeping the relative dielectric constant and temperature coefficient of capacitance low. It was also found that desirably Mg should not be contained in the aforementioned dielectric layer because presence of Mg would significantly reduce the longevity traits, and that the permitted amount of Mg as impurity in equivalent MgO would be one-half the Si content or less in mol ratio. As long as the amount of Mg contained as impurity is no more than one-half the Si content in mol ratio, Mg would exist locally with Si in a stable manner in segregation phases in the dielectric layer and therefore would not cause deterioration of longevity.

The present invention was completed based on these findings and is described as follows. [1] A laminated ceramic capacitor having multiple dielectric layers, internal electrodes which are embedded between the dielectric layers and whose primary component is Cu, and external electrodes which are electrically connected to one end of the internal electrodes, wherein such laminated ceramic capacitor is characterized in that the dielectric layers contain a primary component constituted by a $CaZrO_3$ compound as well as auxiliary components including Mn, B, Si, and Li; formed in the dielectric layers are primary phases constituted by the primary component, segregation phases which contain Ca and at least one of the auxiliary components, and secondary phases which contain at least Ca and Zr; the ratio of Ca to Zr in the secondary phases is smaller than the ratio of Ca to Zr in the primary phases; and there are no more than 30 secondary phases on average per 10-μm square in a cross-section of each of the dielectric layers sandwiched between the internal electrodes when those having a diameter of 100 nm or larger are counted. [2] A laminated ceramic capacitor according to [1] above, characterized in that the primary component of the dielectric layers, constituted by $CaZrO_3$, is $Ca_xZrO_3$ and, when the composition of the dielectric layers is expressed by $Ca_xZrO_3+aMn+bLi+cB+dSi$ (a to d indicate mol ratios relative to 100 mol of $Ca_xZrO_3$), a is contained by $0.5 \leq a \leq 5.0$ mol relative to 100 mol of $Ca_xZrO_3$ (where $1.00 < x \leq 1.15$) and the relationship of x and (b+c+d) falls within the square area enclosed by A-B-C-D below (including points on the lines) where x represents the vertical axis and (b+c+d) represents the horizontal axis; A: (x, b+c+d)=(1.00, 6), B: (x, b+c+d)=(1.06, 15), C: (x, b+c+d)=(1.16, 15), and D: (x, b+c+d)=(1.01, 6). [3] A laminated ceramic capacitor according to [1] or [2] above, characterized in that, if Mg is contained as impurity in the dielectric layers, the content of Mg is one-half or less the content of Si in mol ratio. [4] A laminated ceramic capacitor according to [3] above, characterized in that at least some of the Mg contained as impurity in the dielectric layers exists locally with Si in parts of the segregation phases. [5] A method of manufacturing a laminated ceramic capacitor according to any one of [1] to [4] above, wherein such manufacturing method is characterized by comprising, in this order: a step to prepare a ceramic material that contains a primary component material being a $CaZrO_3$ compound as well as at least Mn, B, Si, and Li as auxiliary component materials in the form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; a sintering step to sinter the chip laminate obtained in the cutting step, in a reducing ambience of 1080° C. or below in temperature, to obtain a sintered compact; and an external electrode-forming step to apply a conductive external electrode paste on both ends of the sintered compact in a manner electrically connecting to the internal electrodes, followed by baking; wherein the ceramic material is kept free of $CaCO_3$ in the material preparation step. [6] A method of manufacturing a laminated ceramic capacitor according to any one of [1] to [4] above, wherein such manufacturing method is characterized by comprising, in this order: a step to prepare a ceramic material that contains a primary component material being a $CaZrO_3$ compound as well as at least Mn, B, Si, and Li as auxiliary component materials in the form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; an external electrode-forming step to apply a conductive external electrode paste on both ends of the chip laminate obtained in the cutting step, in a manner electrically connecting to the internal electrodes; and a sintering step to sinter the chip laminate obtained in the external electrode-forming step, in a reducing ambience of 1080° C. or below in temperature; wherein the ceramic material is kept free of $CaCO_3$ in the material preparation step.

Effects of the Invention

According to the present invention, a laminated ceramic capacitor using Cu in internal electrodes can be produced which offers low relative dielectric constant and temperature coefficient of capacitance, and has excellent voltage resistance and longevity traits, even when sintered at 1080° C. or below. Additionally a manufacturing method conforming to the present invention achieves desired longevity under stress by keeping the ceramic material free of $CaCO_3$ and thereby preventing the number of secondary phases per 10-μm square from exceeding 30. Also under the present invention, when the dielectric layer composition is expressed as $Ca_xZrO_3$+aMn+bLi+cB+dSi, generation of secondary phases of high Zr content is suppressed by containing a by $0.5 \leq a \leq 5.0$ mol relative to 100 mol of $Ca_xZrO_3$ (where $1.00 < x \leq 1.15$) and specifying the relationship of x and (b+c+d). Furthermore under the present invention, as long as the amount of Mg contained as impurity in the dielectric layers is one-half or less the content of Si in mol ratio, at least some of such Mg exists locally with Si in parts of the segregation phases, which suppresses drop in longevity traits.

MODE FOR CARRYING OUT THE INVENTION

Figure 1:
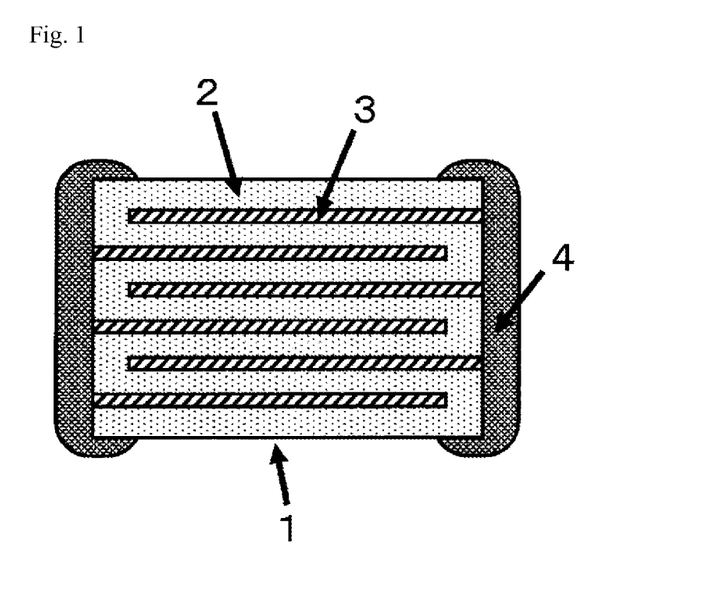
[FIG. 1] Schematic drawing showing an embodiment of the present invention

FIG. 1 is a schematic drawing showing an embodiment of the present invention. As shown in FIG. 1, a laminated ceramic capacitor 1 proposed by the present invention has a constitution whereby dielectric layers 2 each comprising a ceramic sintered compact are alternately layered with internal electrode layers 3 whose primary component is Cu, with a pair of external electrodes 4 formed on both ends of the laminated ceramic capacitor 1 in a manner each connected to the internal electrode layers 3 which are arranged alternately between the dielectric layers 2. The shape of the laminated ceramic capacitor 1 is not limited in any way, but normally it is a rectangular solid. Its dimensions are not limited in any way, either, and any appropriate dimensions can be used according to the application.

The laminated ceramic capacitor 1 proposed by the present invention is such that the dielectric layers 2 have a primary component constituted by a $CaZrO_3$ compound as well as auxiliary components including Mn, B, Si, and Li, characterized in that formed in the dielectric layers are primary component phases 7 which are formed primarily by the primary component and segregation phases 8 which contain at least one of Ca, Mn, B, Si, and Li; secondary phases 9 containing more Zr than the primary component phase are formed separately from the segregation phases; and there are no more than 30 secondary phases 9 on average per 10-μm square in a cross-section of each of the dielectric layers 2 sandwiched between the internal electrode layers 3 when those having a diameter of 100 nm or larger are counted. Under the present invention, the laminated ceramic capacitor tends to see its longevity drop significantly in the high-temperature load test when the number of the secondary phases exceeds 30 on average per 10-μm square.

Under the present invention, the operation and effects of the present invention can be achieved if, when the dielectric layer 2 composition is expressed as $Ca_xZrO_3$+aMn+bLi+cB+dSi, a is contained by $0.5 \leq a \leq 5.0$ mol relative to 100 mol of $Ca_xZrO_3$ (where $1.00 < x \leq 1.15$) and the relationship of x and (b+c+d) falls within the range in Table 1 below, or within the square area (including points on the lines) shown in FIG. 2 which is a graphic representation of this table, as illustrated later in [Examples].

TABLE 1

| | X | |
|---|---|---|
| b + c + d | Lower limit | Upper limit |
| 6 | 1.00 | 1.01 |
| 9 | 1.02 | 1.06 |
| 12 | 1.04 | 1.10 |
| 15 | 1.06 | 1.15 |

Figure 2:
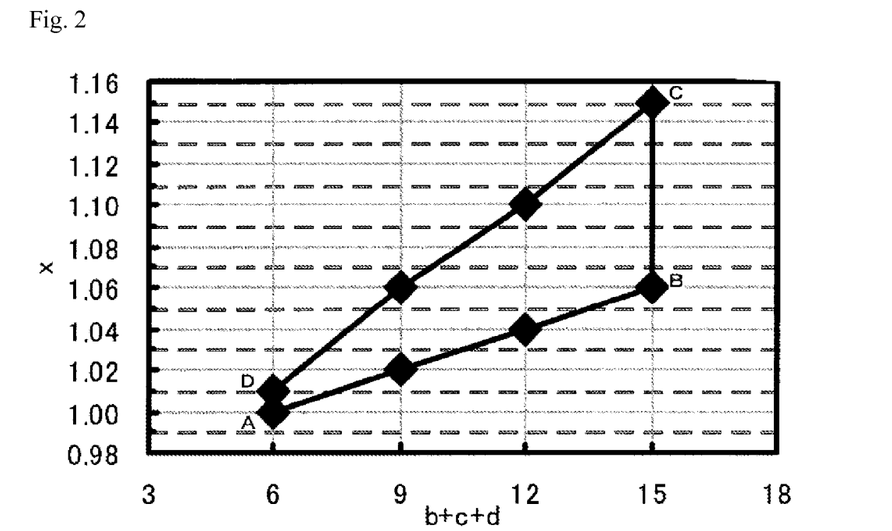
[FIG. 2] Drawing showing the relationship of x and (b+c+d) when the dielectric layer composition under the present invention is expressed as $Ca_xZrO_3$+aMn+bLi+cB+dSi

In other words, the operation and effects of the present invention can be achieved if, in FIG. 2, the relationship of x and (b+c+d) falls within the aforementioned square area enclosed by A-B-C-D (including points on the lines), where A represents a point at which x=1.00 and b+c+d=6, B represents a point at which x=1.06 and b+c+d=15, C represents a point at which x=1.16 and b+c+d=15, and D represents a point at which x=1.01 and b+c+d=6. This range is described in detail below.

A range of x>1.00 is desirable because, if x<1, the abundance of the secondary phases in the dielectric layers 2 tends to increase and cause the longevity of the laminated ceramic capacitor to drop significantly in the high-temperature load test. Also, a range of x≤1.15 is desirable because, if x>1.15, sintering property drops during low-temperature sintering at 1080° C. or below, which makes it difficult to simultaneously sinter the Cu internal electrodes.

Mn is added as an auxiliary component for the purpose of adding reduction resistance to the dielectric layers, but since achieving sufficient effect becomes difficult when a<0.5, a≥0.5 is desirable. Also in the range shown in FIG. 2 (=Table 1), a≤5 is desirable because, if a>5, presence of excessive Mn tends to have the opposite effect by causing the longevity to drop.

Li, B and Si are added for the purpose of sintering the $CaZrO_3$ compound at a low temperature of 1080° C. or below, but since b+c+d<6.0 renders it difficult to make the dielectric layers sufficiently dense at sintering temperatures of 1080° C. or below, b+c+d≥6.0 is desirable. Also when b+c+d>15.0, the abundance state of the secondary phases tends to become non-uniform and causes the longevity of the laminated ceramic capacitor to drop in the high-temperature load test, and therefore b+c+d≤15.0 is desirable.

Furthermore, sintering property drops and it becomes difficult to make the dielectric layers sufficiently dense at sintering temperatures of 1080° C. or below when the relationship of x and (b+c+d) deviates from the range (including points on the lines) in FIG. 2 (=Table 1) and x exceeds the range in FIG. 2 (=Table 1). If x drops below the range in FIG. 2 (=Table 1), on the other hand, the abundance of the secondary phases 9 in the dielectric layers 2 increases and therefore the longevity of the laminated ceramic capacitor drops significantly in the high-temperature load test. Based on the above, it is desirable for the relationship of x and (b+c+d) to fall within the range (including points on the lines) in FIG. 2 (=Table 1).

Furthermore, desirably the dielectric layers do not contain Mg because any Mg compound contained as impurity causes the longevity traits to deteriorate, but Mg is often contained as impurity as it may be contained in the material, etc., used in the crushing step.

Under the present invention, desirably the content of Mg as impurity is one-half or less the content of Si in mol ratio because the longevity traits drop significantly when the content of Mg as impurity in the dielectric layers is more than one-half the content of Si in mol ratio. As long as it is contained by no more than one-half the content of Si in mol ratio, Mg coexists with Si in segregation phases and deterioration of longevity traits is suppressed.

Under the present invention, the aforementioned design of dielectric layers allows for improvement of longevity traits more than that which can be achieved by the prior art, while meeting the JIS CG characteristics specified for the rate of change in capacitance due to temperature and keeping the Q-value at 10,000 or more. As a result, a laminated ceramic capacitor can be obtained which offers improved voltage resistance and longevity traits as well as excellent reliability, while keeping the relative dielectric constant and temperature coefficient of capacitance low, and which is particularly suited for temperature compensation applications. It should be noted that any other element may be contained as long as it does not prevent the object of the present invention. Also, the $CaZrO_3$ compound constituting the primary component of the dielectric layers inevitably contains Hf as impurity.

Next, the method of manufacturing a laminated ceramic capacitor proposed by the present invention is described. The method of manufacturing a laminated ceramic capacitor proposed by the present invention is characterized by comprising: (1) a step to prepare a ceramic material that contains a primary component material being a $CaZrO_3$ compound as well as at least Mn, B, Si, and Li as auxiliary component materials in the form of oxide, glass, or other compound; (2) a sheet-forming step to form ceramic green sheets using the ceramic material; (3) a printing step to print the ceramic green sheets with internal electrode patterns whose primary component is Cu; (4) a lamination step to laminate the ceramic green sheets completing the printing step to form a laminate; (5) a cutting step to cut the laminate to each internal electrode pattern to obtain a chip laminate; (6) a sintering step to sinter the chip laminate obtained in the cutting step, in a reducing ambience of 1080° C. or below, or preferably 1030° C. or below, in temperature, to obtain a sintered compact; and (7) an external electrode-forming step to apply a conductive external electrode paste on both ends of the sintered compact in a manner electrically connecting to the internal electrodes, followed by baking; wherein the ceramic material is kept free of unreacted $CaCO_3$ in the ceramic material preparation step (2) above.

As revealed by the examples described later, presence of unreacted $CaCO_3$ in the ceramic material or addition of $CaCO_3$ as an auxiliary component prevents desired longevity under stress from being achieved because, although the Ca/Zr ratio in the ceramic sintered compact falls within the aforementioned specified range in equivalent x, the number of secondary phases per 10-μm square exceeds 30. If a $CaZrO_3$ compound is used as the primary component, therefore, it is necessary to cause $CaCO_3$ and other materials to react completely beforehand, and it is not desirable to add $CaCO_3$ as an auxiliary component for the purpose of adjusting x.

Furthermore in the external electrode-forming step (7), it is also possible to apply a conductive external electrode paste on both ends of the chip laminate obtained in the cutting step, in a manner electrically connecting to the internal electrodes and then perform sintering in a reducing ambience of 1080° C. or below, or preferably 1030° C. or below, in temperature, thereby effectively implementing the external electrode-forming step and sintering step simultaneously.

EXAMPLES

The present invention is explained in more detail below using examples, but it should be noted that the present invention is not limited to these examples.

Example 1

For the ceramic material to constitute the primary component, $CaCO_3$ and $ZrO_2$ were weighed and added by the specified amounts to achieve each ratio shown in Table 2. Next, these weighed materials were put in a pot mill together with ceramic balls and wet-mixed/pulverized, after which the pulverized mixture was put in a stainless vat and dried at 150° C. using a hot-air dryer and then calcined for approx. 2 hours in an atmosphere of 900 to 1200° C., to obtain $Ca_xZrO_3$. The obtained $Ca_xZrO_3$ powder was analyzed by XRD to check for unreacted $CaCO_3$. In Table 2, the $Ca_xZrO_3$ powder sample in which XRD analysis found $CaCO_3$ is indicated by ▲.

TABLE 2

| Sample No. | $CaCO_3$ (mol %) | $ZrO_2$ (mol %) | Synthesis temperature | $Ca_XZrO_3$ | Unreacted $CaCO_3$ |
|---|---|---|---|---|---|
| 101 | 99 | 100 | 900° C. | X = 0.99 | |
| 102 | 100.5 | 100 | 900° C. | X = 1.005 | |
| 103 | 101 | 100 | 1000° C. | X = 1.01 | |
| 104 | 102 | 100 | 1000° C. | X = 1.02 | |
| 105 | 104 | 100 | 1150° C. | X = 1.04 | |
| 106 | 106 | 100 | 1150° C. | X = 1.06 | |
| 107 | 108 | 100 | 900° C. | X = 1.08 | ▲ |
| 108 | 108 | 100 | 1150° C. | X = 1.08 | |
| 109 | 110 | 100 | 1200° C. | X = 1.10 | |
| 110 | 115 | 100 | 1200° C. | X = 1.15 | |
| 111 | 120 | 100 | 1200° C. | X = 1.20 | |

Next, for the $Ca_xZrO_3$ synthesized above, auxiliary components of $MnO_2$, $Li_2CO_3$, $B_2O_3$, and $SiO_2$ were weighed to obtain each specified composition shown in Table 3. As comparative examples, samples to which $CaCO_3$ or MgO was added were also prepared. Among the weighed materials, only the auxiliary components were wet-mixed with ethanol, dried, and then calcined for approx. 1 hour in an atmosphere of 600° C. to obtain tentatively baked auxiliary components. Thereafter, these materials ($Ca_xZrO_3$ powder and tentatively baked auxiliary components) were again wet-mixed/pulverized with ethanol and then dried to obtain a dielectric powder. It should be noted that these ceramic materials to provide primary and auxiliary components need not be carbonates or oxides as long as they turn into an oxide as a result of heat treatment.

The obtained dielectric powder was analyzed by XRF to check the concentration of MgO impurity (percent by mol). The results are shown in Table 3.

applied on polyester films using a reverse roll coater, etc., to produce green sheets of 5 to 50 μm in thickness. They were then cut to the specified dimensions to obtain rectangular ceramic green sheets. An internal electrode paste whose primary component is Cu was printed on the obtained rectangular ceramic green sheets using screen printing or other method to form conductive patterns. The internal electrode paste was prepared by kneading and mixing metal fine particles whose primary component is Cu, together with, among others, an organic vehicle comprising organic binder dissolved in solvent.

Next, multiple ceramic green sheets on which conductive patterns were formed were layered in a specified direction. They were arranged so that each adjacent pair of ceramic green sheets on top and bottom had their printed sides offset by approximately one-half the length in the lengthwise direc-

TABLE 3

| | | Auxiliary component per 100 percent by mol of primary component (percent by mol) | | | | | | | | | | | | | (mol %) | |
|---|---|---|---|---|---|---|---|---|---|---|---|---|---|---|---|---|
| Sample No. | CaZrO$_3$ material (No.) | MnO2 | Li2CO3 | B2O3 | SiO2 | CaCO3 | MgO | a | b | c | d | b+c+d | x | Densification (° C.) | XRF (MgO) | Mg/Si |
| *  201 | 101 | 2.0 | 1.3 | 1.6 | 3.2 | | | 2.0 | 2.6 | 3.2 | 3.2 | 9 | 0.99 | 980 | 0.7 | 0.22 |
| 202 | 102 | 0.5 | 0.8 | 1.4 | 1.6 | | | 0.5 | 1.6 | 2.8 | 1.6 | 6 | 1.005 | 1030 | 0.7 | 0.44 |
| *  203 | 102 | 1.0 | 1.9 | 2.5 | 3.2 | | | 1.0 | 3.8 | 5.0 | 3.2 | 12 | 1.005 | 940 | 0.7 | 0.22 |
| *  204 | 102 | 4.0 | 2.2 | 3.0 | 4.6 | | | 4.0 | 4.4 | 6.0 | 4.6 | 15 | 1.005 | 940 | 0.7 | 0.15 |
| 205 | 103 | 1.0 | 0.8 | 1.4 | 1.6 | | | 1.0 | 1.6 | 2.8 | 1.6 | 6 | 1.01 | 1030 | 0.7 | 0.44 |
| *  206 | 104 | 2.0 | 1.7 | 3.3 | 5.0 | | | 2.0 | 3.4 | 6.6 | 5.0 | 15 | 1.02 | 940 | 0.6 | 0.12 |
| 207 | 104 | 1.5 | 1.1 | 2.3 | 2.2 | | | 1.5 | 2.2 | 4.6 | 2.2 | 9 | 1.02 | 1000 | 0.6 | 0.27 |
| 208 | 105 | 1.0 | 1.2 | 2.0 | 2.6 | | | 1.0 | 2.4 | 4.0 | 2.6 | 9 | 1.04 | 1020 | 0.7 | 0.27 |
| 209 | 105 | 1.5 | 1.3 | 2.8 | 3.8 | | | 1.5 | 2.6 | 5.6 | 3.8 | 12 | 1.04 | 960 | 0.7 | 0.18 |
| 210 | 106 | 1.0 | 1.4 | 1.8 | 2.6 | | | 1.0 | 2.8 | 3.6 | 2.6 | 9 | 1.06 | 1030 | 0.6 | 0.23 |
| 211 | 106 | 3.5 | 2.5 | 2.5 | 5.0 | | | 3.5 | 5.0 | 5.0 | 5.0 | 15 | 1.06 | 960 | 0.6 | 0.12 |
| 212 | 106 | 3.0 | 1.6 | 2.7 | 3.4 | | | 3.0 | 3.2 | 5.4 | 3.4 | 12 | 1.06 | 980 | 0.6 | 0.18 |
| 213 | 108 | 2.0 | 1.6 | 2.7 | 3.4 | | | 2.0 | 3.2 | 5.4 | 3.4 | 12 | 1.08 | 980 | 0.6 | 0.18 |
| *  214 | 108 | 3.0 | 0.8 | 1.4 | 1.6 | | | 3.0 | 1.6 | 2.8 | 1.6 | 6 | 1.08 | X | 0.6 | 0.38 |
| 215 | 109 | 2.5 | 2.0 | 3.4 | 4.2 | | | 2.5 | 4.0 | 6.8 | 4.2 | 15 | 1.10 | 980 | 0.7 | 0.17 |
| *  216 | 109 | 3.0 | 1.1 | 2.0 | 2.8 | | | 3.0 | 2.2 | 4.0 | 2.8 | 9 | 1.10 | X | 0.7 | 0.25 |
| 217 | 109 | 1.5 | 1.6 | 2.2 | 4.4 | | | 1.5 | 3.2 | 4.4 | 4.4 | 12 | 1.10 | 1020 | 0.7 | 0.16 |
| 218 | 110 | 5.0 | 2.1 | 3.2 | 4.4 | | | 5.0 | 4.2 | 6.4 | 4.4 | 15 | 1.15 | 1020 | 0.6 | 0.14 |
| *  219 | 110 | 3.5 | 1.4 | 3.0 | 3.2 | | | 3.5 | 2.8 | 6.0 | 3.2 | 12 | 1.15 | X | 0.6 | 0.19 |
| *  220 | 111 | 2.0 | 2.3 | 3.5 | 3.4 | | | 2.0 | 4.6 | 7.0 | 3.4 | 15 | 1.20 | X | 0.6 | 0.18 |
| *  221 | 107 | 2.0 | 1.6 | 2.4 | 4.0 | | | 2.0 | 3.2 | 4.8 | 4.0 | 12 | 1.08 | 980 | 0.6 | 0.15 |
| *  222 | 102 | 3.5 | 2.1 | 3.1 | 4.6 | 15.0 | | 3.5 | 4.2 | 6.2 | 4.6 | 15 | 1.15 | 1020 | 0.7 | 0.15 |
| 223 | 109 | 3.0 | 2.1 | 3.5 | 3.8 | | 0.5 | 3.0 | 4.2 | 7.0 | 3.8 | 15 | 1.10 | 980 | 1.2 | 0.32 |
| 224 | 109 | 3.0 | 2.1 | 3.5 | 3.8 | | 1.2 | 3.0 | 4.2 | 7.0 | 3.8 | 15 | 1.10 | 980 | 1.9 | 0.50 |
| *  225 | 109 | 3.0 | 2.1 | 3.5 | 3.8 | | 2.0 | 3.0 | 4.2 | 7.0 | 3.8 | 15 | 1.10 | 980 | 2.7 | 0.71 |
| 226 | 106 | 1.0 | 1.4 | 1.8 | 2.6 | | 1.0 | 1.0 | 2.8 | 3.6 | 2.6 | 12 | 1.06 | 980 | 1.9 | 0.73 |
| *  227 | 102 | 0.5 | 0.9 | 1.5 | 1.2 | | | 0.5 | 1.8 | 3.0 | 1.2 | 6 | 1.005 | 1030 | 0.9 | 0.75 |

* indicates a comparative example.

Also, as an experiment before checking sintering property, the obtained dielectric powder was pelletized using polyvinyl alcohol, etc., and then put in the specified die and uniaxially molded, after which the molded product was kept for 2 hours at a desired sintering temperature in an ambience of $N_2$ 98%-$H_2$ 2% gas containing water vapor, to obtain a ceramic sintered compact. The obtained ceramic sintered compact was measured for open pore ratio according to JIS-R1634 and the temperature at which the open pore ratio became 2.5% or below was taken as the densification temperature. The densification temperature of each sample is shown in Table 3. The samples that did not become denser at 1080° C. or below are indicated by X.

Next, among the dielectric powders obtained above, each of the samples that became denser at 1080° C. or below was mixed with PVB binder (or acrylic binder), plasticizer, and organic solvent as medium, as deemed appropriate, to produce a ceramic slurry, after which the ceramic slurry was tion of the internal electrode patterns. Furthermore, ceramic green sheets functioning as protective layers with no internal electrode patterns printed on them, were layered and pressure-bonded onto the top face and bottom face of the laminate. Thereafter, the pressure-bonded laminate was cut to the specified shape to prepare a ceramic laminate. Thereafter, binder was removed at 300 to 600° C. in an ambience inert enough not to oxidize Cu, after which the temperature was raised at a rate of 300° C. per hour to the specified sintering temperature (940 to 1030° C.), in an ambience of $N_2$ 98%-$H_2$ 2% gas containing water vapor. Once reached, the sintering temperature was held for 2 hours, which was followed by cooling at a rate of 300° C. per hour to obtain a laminated ceramic sintered compact having internal electrodes 3 embedded in it.

Next, this laminated ceramic sintered compact was barreled to expose the internal electrodes 2 from the end faces of the sintered compact, after which an external electrode paste was applied on both ends and dried, followed by baking at the specified temperature (700 to 900° C.) in an ambience of $N_2$ gas, to form external electrodes 4. The external electrode paste was prepared by kneading and mixing metal fine particles whose primary component is Cu, together with, among others, an organic vehicle, a small amount of frit, etc.; however, the external electrode paste is not limited to the foregoing, and Ni, Ag, etc., can also be used as external electrodes.

When the laminated ceramic capacitor thus prepared was cut in the direction of cross-section of laminated internal electrodes and then a FE-SEM (field emission-scanning electron microscope) was used to observe composition images at a magnification factor of 10,000 at five points selected randomly in the dielectric layers 2 sandwiched between the internal electrodes, all samples were confirmed to be formed by three phases (three patterns) of different colors corresponding to locations appearing white, gray and black. These phases are defined as the primary component phase 7 (location appearing gray), segregation phase 8 (location appearing black) and secondary phase 9 (location appearing white). So as not to observe close locations, observation locations were carefully selected in such a way that the five locations would include those at the top edge, bottom edge, left edge, right edge and center of the dielectric laminate comprising alternately layered internal electrodes.

Figure 3:
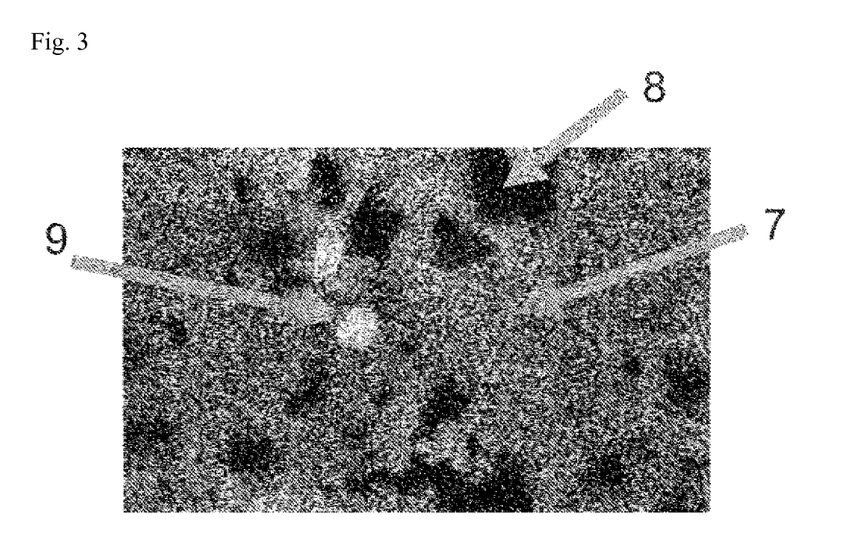
[FIG. 3] Drawing showing a representative example of composition image observation

A representative example of composition image observation is shown in FIG. 3. To identify the composition of each phase, the EDX (energy dispersive X-ray spectrometry) unit supplied with the FE-SEM was used to analyze the composition of each phase, after which the ZAF quantification method was used to calculate Ca/Zr (atm ratio) in each phase. To describe the method in greater detail, the primary component phase 7 was spot-analyzed with the EDS at a total of 10 locations including two desired points formed by the primary component, each selected from the five composition images observed early at a magnification factor of 10,000, after which the ZAF quantification method was used to calculate Ca/Zr (atm ratio) at each point and then the average of all points was calculated. On the other hand, the segregation phase 8 was also spot-analyzed with the EDS at up to 10 locations corresponding to desired points formed by the segregation phase 8 and selected from the five composition images observed earlier at a magnification factor of 10,000 (if the segregation phase 8 was found at fewer than 10 locations within the observed range, all observed locations were selected; also, segregation phases were selected as evenly as possible from each location), after which the ZAF quantification method was used to calculate Ca/Zr (atm ratio) at each point and then the average of all points was calculated.

The results indicate the magnitude correlation: "Average Ca/Zr in primary component phases 7<Average Ca/Zr in segregation phases 8." Also, Si and Mn peaks were observed at several EDS-analyzed locations of segregation phases 8. It is known that, in FE-SEM composition image observation, locations containing light elements appear black, while locations containing heavy elements appear white. Li and B are rarely detected in EDS analysis due to low detection sensitivities, but given the fact that the segregation phases appear dark in the composition images, there is no contradiction in saying that Li and B are also present in some of the segregation phases. When the segregation phases 8 were checked for Si content, Si was present in approximately half of them, which indicates that around a half of the segregation phases 8 contain Si and that other segregation phases are primarily B and/or Li. This, combined with the analysis result of Ca/Zr (atm ratio), also suggests that Ca is eluting to segregation phases from some primary component phases constituted by a $CaZrO_3$ compound. Furthermore, while Mg peaks were detected in some EDS-analyzed locations of segregation phases 8, Si peaks were also detected in the locations where Mg was detected, suggesting that Mg and Si coexist in segregation phases 8.

Next, the secondary phase 9 was also spot-analyzed with the EDS at up to 10 locations corresponding to desired points formed by the secondary phase 9 and selected from the five composition images observed earlier at a magnification factor of 10,000 (if the secondary phase 9 was found at fewer than 10 locations within the observed range, all observed locations were selected; also, secondary phases 9 were selected as evenly as possible from each location), after which the ZAF quantification method was used to calculate Ca/Zr (atm ratio) at each point and then the average of all points was calculated.

The results indicate the magnitude correlation: "Average Ca/Zr in primary component phases 7>Average Ca/Zr in secondary phases 9." This suggests that the secondary phases 9 are locally generated phases of high Zr content, resulting from elution of Ca to segregation phases 8 from primary component phases 7. Also, as mentioned earlier, it is known that, in FE-SEM composition image observation, locations containing heavy elements appear white, and therefore all white locations obtained from the composition image observation examined here are considered secondary phases 9 of high Zr content. Here, the acceleration voltage used in the observation and EDS analysis was 15 kVe, and in the spot analyses of primary component phases 7, segregation phases 8 and secondary phases 9, only those phases of 100 nm or larger in maximum diameter were selected in consideration of the analysis sensitivity of the EDS. The operation of fine secondary phases of 100 nm or smaller is considered sufficiently small.

Accordingly, to verify the abundance of secondary phases in each sample, all secondary phases 9 of 100 nm or larger in maximum diameter were counted in the aforementioned composition image observation area. Furthermore, the total area of dielectric layers in the composition image observation area, less the electrode portions, was calculated and the number of secondary phases 9 per 10-μm square (unit area) was calculated from the total area. To eliminate the difficulty of removing the electrode portions, it is desirable that, when the pitch of alternately layered internal electrode layers 3 is 10 μm or more, the composition image is observed by not including the internal electrode layers 3. If the pitch of alternately layered internal electrode layers 3 is 10 μm or less, on the other hand, it is also possible to cut out a rectangular shape of maximum possible size from the dielectric layers 2 without including the internal electrode layers 3, and then count all secondary phases 9 of 100 nm or larger in maximum diameter. Table 4 shows the number of secondary phases 9 per 10-μm square, relative dielectric constant, temperature dependence of capacitance, and longevity in the longevity-under-stress test, of each sample.

TABLE 4

| Sample No. | a | b | c | d | b+c+d | x | Mg/Si | Sintering temperature (° C.) | Number of secondary phases/ 10-um$^2$ | Relative dielectric constant | Q-value | Temperature standard | Longevity under stress |
|---|---|---|---|---|---|---|---|---|---|---|---|---|---|
| * 201 | 2.0 | 2.6 | 3.2 | 3.2 | 9 | 0.99 | 0.25 | 980 | 40 | 25 | >10000 | CG | X |
| 202 | 0.5 | 1.6 | 2.8 | 1.6 | 6 | 1.005 | 0.38 | 1030 | 6 | 26 | >10000 | CG | ○ |
| * 203 | 1.0 | 3.8 | 5.0 | 3.2 | 12 | 1.005 | 0.25 | 940 | 54 | 27 | >10000 | CG | X |
| * 204 | 4.0 | 4.4 | 6.0 | 4.6 | 15 | 1.005 | 0.20 | 940 | 70 | 27 | >10000 | CG | X |
| 205 | 1.0 | 1.6 | 2.8 | 1.6 | 6 | 1.01 | 0.38 | 1030 | 7 | 26 | >10000 | CG | ○ |
| * 206 | 2.0 | 3.4 | 6.6 | 5.0 | 15 | 1.02 | 0.16 | 940 | 68 | 27 | >10000 | CG | X |
| 207 | 1.5 | 2.2 | 4.6 | 2.2 | 9 | 1.02 | 0.36 | 1000 | 16 | 26 | >10000 | CG | ○ |
| 208 | 1.0 | 2.4 | 4.0 | 2.6 | 9 | 1.04 | 0.27 | 1020 | 10 | 26 | >10000 | CG | ○ |
| 209 | 1.5 | 2.6 | 5.6 | 3.8 | 12 | 1.04 | 0.24 | 960 | 22 | 27 | >10000 | CG | ○ |
| 210 | 1.0 | 2.8 | 3.6 | 2.6 | 9 | 1.06 | 0.31 | 1030 | 4 | 25 | >10000 | CG | ○ |
| 211 | 3.5 | 5.0 | 5.0 | 5.0 | 15 | 1.06 | 0.16 | 960 | 28 | 26 | >10000 | CG | ○ |
| 212 | 3.0 | 3.2 | 5.4 | 3.4 | 12 | 1.06 | 0.21 | 980 | 13 | 25 | >10000 | CG | ○ |
| 213 | 2.0 | 3.2 | 5.4 | 3.4 | 12 | 1.08 | 0.24 | 980 | 6 | 25 | >10000 | CG | ○ |
| * 214 | 3.0 | 1.6 | 2.8 | 1.6 | 6 | 1.08 | 0.44 | X | — | — | — | — | — |
| 215 | 2.5 | 4.0 | 6.8 | 4.2 | 15 | 1.10 | 0.14 | 980 | 15 | 25 | >10000 | CG | ○ |
| * 216 | 3.0 | 2.2 | 4.0 | 2.8 | 9 | 1.10 | 0.25 | X | — | — | — | — | — |
| 217 | 1.5 | 3.2 | 4.4 | 4.4 | 12 | 1.10 | 0.16 | 1020 | 5 | 26 | >10000 | CG | ○ |
| 218 | 5.0 | 4.2 | 6.4 | 4.4 | 15 | 1.15 | 0.18 | 1020 | 11 | 26 | >10000 | CG | ○ |
| * 219 | 3.5 | 2.8 | 6.0 | 3.2 | 12 | 1.15 | 0.25 | X | — | — | — | — | — |
| * 220 | 2.0 | 4.6 | 7.0 | 3.4 | 12 | 1.20 | 0.28 | X | — | — | — | — | — |
| * 221 | 2.0 | 3.2 | 4.8 | 4.0 | 12 | 1.08 | 0.18 | 980 | 39 | 26 | >10000 | CG | X |
| * 222 | 3.5 | 4.2 | 6.2 | 4.6 | 15 | 1.15 | 0.17 | 1020 | 43 | 25 | >10000 | CG | X |
| 223 | 3.0 | 4.2 | 7.0 | 3.8 | 15 | 1.10 | 0.34 | 980 | 16 | 24 | >10000 | CG | ○ |
| 224 | 3.0 | 4.2 | 7.0 | 3.8 | 15 | 1.10 | 0.47 | 980 | 17 | 24 | >10000 | CG | ○ |
| * 225 | 3.0 | 4.2 | 7.0 | 3.8 | 15 | 1.10 | 0.71 | 980 | 18 | 25 | >10000 | CG | X |
| * 226 | 1.0 | 2.8 | 3.6 | 2.6 | 12 | 1.06 | 0.73 | 980 | 14 | 25 | >10000 | CG | X |
| * 227 | 0.5 | 1.8 | 3.0 | 1.2 | 6 | 1.005 | 0.75 | 1030 | 6 | 25 | >10000 | CG | X |

* indicates a comparative example.

In the above, an auto-bridge measuring equipment was used to measure the capacitance C and Q-value at a frequency of 1 MHz, effective voltage of 1 AC Vrms and temperature of 25° C., and the relative dielectric constant was calculated from the capacitance C and sample dimensions. As for the temperature dependence of capacitance, an ○ was given if the result was within the JIS CG standard range at temperatures ranging from −55° C. to 150° C., and an X was given if not. Furthermore, in the longevity-under-stress test, where each sample was set in a thermostatic chamber that had been heated to 150° C. and then voltage equivalent to an electric field intensity of 40 V/μm was applied to the dielectric layers between the alternately layered internal electrodes, an ○ was given if the average longevity under stress until dielectric breakdown was 100 hours or more, and an X was given if not.

As shown in Table 4, sample 201 of x≤1 had more than 30 secondary phases per 10-μm square and therefore the specified longevity under stress could not be obtained. This is likely due to elution of the Ca component from the primary component to segregation phases in the sintering step. Accordingly, it is desirable to set x>1 for the primary component material in consideration of elution of the Ca component. Also, as shown in Table 3, samples 214, 216, 219 and 220 could not be made denser at 1080° C. or below. This indicates that deviation of x from the optimal range in FIG. 2 (=Table 1) to the excessive side is not desirable as it makes densification difficult at 1080° C. or below.

Also, as shown in Table 4, samples 202, 203, 204 and 206 had more than 30 secondary phases per 10-μm square and therefore the specified longevity under stress could not be obtained. This indicates that insufficient x below the optimal range in FIG. 2 makes it impossible to suppress generation of secondary phases and achieve desired longevity under stress.

Also, presence of unreacted $CaCO_3$ as in the case of sample 221, or addition of $CaCO_3$ as an auxiliary component as in the case of sample 222, prevents achievement of desired longevity under stress because, although the Ca/Zr ratio in the ceramic sintered compact becomes 1.08 in the former and 1.15 in the latter in equivalent x, the number of secondary phases per 10-μm square exceeds 30. This means that, if the primary component is a $CaZrO_3$ compound, it is necessary to cause $CaCO_3$ and other materials to react completely beforehand, and adding $CaCO_3$ as an auxiliary component for the purpose of adjusting x is not desirable.

Also, from samples 223 to 226 and 227 prepared to check the influence of MgO impurity amount, it was confirmed that desired longevity under stress could not be achieved when the Mg/Si mol ratio exceeded 0.5. As mentioned earlier, Mg that has entered as impurity likely does not affect the product longevity negatively because some of it at least coexists with Si in the sintering step, but when the Mg/Si mol ratio exceeds 0.5, a high percentage of Mg that cannot coexist with Si is a likely cause of deteriorating longevity. For this reason, desirably the Mg/Si mol ratio is 0.5 or less.

Example 2

For the ceramic material to constitute the primary component, $CaCO_3$ and $ZrO_2$ were weighed and added by the specified amounts to achieve each ratio shown in Table 5. Next, these weighed materials were wet-mixed/pulverized with a material selected to prevent mixing-in of Mg (zirconium balls, etc.), after which the pulverized mixture was tentatively baked to obtain $Ca_xZrO_3$, in the same manner as in Example 1. The obtained $Ca_xZrO_3$ powder was analyzed by XRD to check for unreacted $CaCO_3$. No unreacted $CaCO_3$ was found under the conditions shown in Table 5.

TABLE 5

| Sample No. | (mol %) CaCO3 | (mol %) ZrO2 | Synthesis temperature | Unreacted CaXZrO3 | CaCO3 |
|---|---|---|---|---|---|
| 121 | 100.5 | 100 | 900° C. | X = 1.005 | |
| 122 | 101 | 100 | 1000° C. | X = 1.01 | |
| 123 | 104 | 100 | 1150° C. | X = 1.04 | |
| 124 | 106 | 100 | 1150° C. | X = 1.06 | |
| 125 | 108 | 100 | 1150° C. | X = 1.08 | |
| 126 | 110 | 100 | 1200° C. | X = 1.10 | |
| 127 | 115 | 100 | 1200° C. | X = 1.15 | |

Next, for the $Ca_xZrO_3$ synthesized above, auxiliary components of $MnO_2$, $Li_2CO_3$, $B_2O_3$, and $SiO_2$ were weighed to obtain each specified composition shown in Table 6. Among the weighed materials, only the auxiliary components were wet-mixed with ethanol, dried, and then tentatively baked for approx. 1 hour in an atmosphere of 600° C. to obtain tentatively baked auxiliary components. Thereafter, these materials ($Ca_xZrO_3$ powder and tentatively baked auxiliary components) were again wet-mixed/pulverized with ethanol and then dried to obtain a dielectric powder. Thereafter, these materials were wet-mixed using a material selected to prevent mixing-in of Mg, and then dried to obtain a dielectric powder.

The obtained dielectric powder was confirmed by XRF analysis to be free of MgO as impurity. The results are shown in Table 6.

TABLE 6

| Sample No. | CaZrO3 material (No.) | MnO2 | Li2CO3 | B2O3 | SiO2 | a | b | c | d | b + c + d | x | Densification (° C.) | XRF (MgO) | Mg/Si |
|---|---|---|---|---|---|---|---|---|---|---|---|---|---|---|
| 231 | 121 | 0.5 | 0.8 | 1.4 | 1.6 | 0.5 | 1.6 | 2.8 | 1.6 | 6 | 1.005 | 1030 | 0 | 0.00 |
| 232 | 122 | 1 | 0.8 | 1.4 | 1.6 | 1.0 | 1.6 | 2.8 | 1.6 | 6 | 1.01 | 1030 | 0 | 0.00 |
| 233 | 123 | 1.5 | 1.3 | 2.8 | 3.8 | 1.5 | 2.6 | 5.6 | 3.8 | 12 | 1.04 | 960 | 0 | 0.00 |
| 234 | 124 | 3.5 | 2.5 | 2.5 | 5 | 3.5 | 5.0 | 5.0 | 5.0 | 15 | 1.06 | 960 | 0 | 0.00 |
| 235 | 125 | 2 | 1.6 | 2.7 | 3.4 | 2.0 | 3.2 | 5.4 | 3.4 | 12 | 1.08 | 980 | 0 | 0.00 |
| 236 | 126 | 2.5 | 2 | 3.4 | 4.2 | 2.5 | 4.0 | 6.8 | 4.2 | 15 | 1.10 | 980 | 0 | 0.00 |
| 237 | 126 | 1.5 | 1.6 | 2.2 | 4.4 | 1.5 | 3.2 | 4.4 | 4.4 | 12 | 1.10 | 1020 | 0 | 0.00 |
| 238 | 127 | 5 | 2.1 | 3.2 | 4.4 | 5.0 | 4.2 | 6.4 | 4.4 | 15 | 1.15 | 1020 | 0 | 0.00 |
| * 239 | 126 | 4 | 2.7 | 3.4 | 5.8 | 4.0 | 5.4 | 6.8 | 5.8 | 18 | 1.10 | 1020 | 0 | 0.00 |
| * 240 | 127 | 5 | 2.9 | 3.9 | 4.4 | 5.0 | 5.8 | 7.8 | 4.4 | 18 | 1.15 | 1020 | 0 | 0.00 |
| * 241 | 121 | 0 | 0.8 | 1.4 | 1.6 | 0.0 | 1.6 | 2.8 | 1.6 | 6 | 1.005 | 1030 | 0 | 0.00 |
| * 242 | 127 | 6 | 2.1 | 3.2 | 4.4 | 6.0 | 4.2 | 6.4 | 4.4 | 15 | 1.15 | 1020 | 0 | 0.00 |

* indicates a comparative example.

The dielectric powder obtained above was mixed with PVB binder (or acrylic binder), plasticizer, and organic solvent as medium, as deemed appropriate, to produce a ceramic slurry, after which the ceramic slurry was applied on polyester films using a reverse roll coater, etc., to produce green sheets of 5 to 50 µm in thickness. They were then cut to the specified dimensions to obtain rectangular ceramic green sheets. An internal electrode paste whose primary component is Cu was printed on the obtained rectangular ceramic green sheets using screen printing or other method to form conductive patterns. Next, multiple ceramic green sheets with conductive patterns formed on them were layered in a specified direction. They were arranged so that each adjacent pair of ceramic green sheets on top and bottom had their printed sides offset by approximately one-half the length in the lengthwise direction of the internal electrode patterns. Furthermore, ceramic green sheets functioning as protective layers with no internal electrode patterns printed on them, were layered and pressure-bonded onto the top face and bottom face of the laminate. Thereafter, the pressure-bonded laminate was cut to the specified shape to prepare a ceramic laminate.

Next, an external electrode paste was applied on the end faces of the cut-out ceramic laminate where the internal electrodes 2 were exposed, and then dried, after which binder was removed at 300 to 600° C. in an inert ambience (inert enough not to oxidize Cu), and then the temperature was raised at a rate of 300° C. per hour to the specified sintering temperature (940 to 1030° C.), in an ambience of $N_2$ gas containing water vapor, and once reached, the sintering temperature was held for 2 hours, which was followed by cooling at a rate of 300° C. per hour to effectively sinter the laminated ceramic and form external electrodes 4 simultaneously. The obtained laminated ceramic capacitor was evaluated in the same manner as in Example 1, the results of which are shown in Table 7.

TABLE 7

| Sample No. | a | b | c | d | b + c + d | x | Mg/Si | Sintering temperature (° C.) | Number of secondary phases/ 10-um² | Relative dielectric constant | Q-value | Temperature standard | Accelerated life |
|---|---|---|---|---|---|---|---|---|---|---|---|---|---|
| 231 | 0.5 | 1.6 | 2.8 | 1.6 | 6 | 1.005 | 0 | 1030 | 5 | 26 | >10000 | CG | ○ |
| 232 | 1.0 | 1.6 | 2.8 | 1.6 | 6 | 1.01 | 0 | 1030 | 5 | 26 | >10000 | CG | ○ |
| 233 | 1.5 | 2.6 | 5.6 | 3.8 | 12 | 1.04 | 0 | 960 | 23 | 26 | >10000 | CG | ○ |
| 234 | 3.5 | 5.0 | 5.0 | 5.0 | 15 | 1.06 | 0 | 960 | 28 | 26 | >10000 | CG | ○ |
| 235 | 2.0 | 3.2 | 5.4 | 3.4 | 12 | 1.08 | 0 | 980 | 9 | 27 | >10000 | CG | ○ |
| 236 | 2.5 | 4.0 | 6.8 | 4.2 | 15 | 1.10 | 0 | 980 | 17 | 27 | >10000 | CG | ○ |
| 237 | 1.5 | 3.2 | 4.4 | 4.4 | 12 | 1.10 | 0 | 1020 | 6 | 26 | >10000 | CG | ○ |
| 238 | 5.0 | 4.2 | 6.4 | 4.4 | 15 | 1.15 | 0 | 1020 | 14 | 26 | >10000 | CG | ○ |
| * 239 | 4.0 | 5.4 | 6.8 | 5.8 | 18 | 1.10 | 0 | 1020 | 42 | 27 | >10000 | CG | X |

TABLE 7-continued

| Sample No. | a | b | c | d | b+c+d | x | Mg/Si | Sintering temperature (° C.) | Number of secondary phases/ 10-um$^2$ | Relative dielectric constant | Q-value | Temperature standard | Accelerated life |
|---|---|---|---|---|---|---|---|---|---|---|---|---|---|
| * 240 | 5.0 | 5.8 | 7.8 | 4.4 | 18 | 1.15 | 0 | 1020 | 38 | 27 | >10000 | CG | X |
| * 241 | 0.0 | 1.6 | 2.8 | 1.6 | 6 | 1.005 | 0 | 1030 | 5 | 27 | >10000 | CG | X |
| * 242 | 6.0 | 4.2 | 6.4 | 4.4 | 15 | 1.15 | 0 | 1020 | 16 | 27 | >10000 | CG | X |

* indicates a comparative example.

As shown, it is possible to form external electrodes simultaneously as the laminated ceramic is sintered and still obtain a laminated ceramic capacitor. Also, as shown by the evaluation results of samples 231 to 238 in Table 7, generation of secondary phases can be suppressed in a range meeting 0.5≤a≤5 and FIG. 2 (=Table 1), regardless of whether or not Mg mixes in during the process steps, and consequently desired longevity traits can be achieved in the longevity-under-stress test. On the other hand, the average longevity in the longevity-under-stress test tended to decrease at b+c+d>15, as shown by samples 239 and 240. When a component that forms segregation phase is added by a large amount, local variation is likely to occur in the elution of Ca from the primary component. When this happens, even if the average number of secondary phases 9 per 10-μm square is 30 or less, the secondary phase separates more in some locations, and this is probably a contributing factor of drop in longevity. Accordingly, a range of b+c+d≥15 is desirable. Also in this composition system, Mn is added for the purpose of adding reduction resistance, but if Mn is not added, as is the case with sample 241, sufficient reduction resistance cannot be provided and desired longevity cannot be ensured. Also, as shown by sample 242, addition of excessive Mn produced the opposite effect and caused the reliability to drop. In this composition system, therefore, desirably Mn is added by 0.5≤a≤5.0.

The above confirms that a laminated ceramic capacitor using Cu in internal electrodes can be produced using a dielectric porcelain whose primary component is $CaZrO_3$, even when sintered at 1080° C. or below; wherein such laminated ceramic capacitor, having multiple dielectric layers, internal electrodes which are embedded between the dielectric layers and whose primary component is Cu, and external electrodes which are electrically connected to one end of the internal electrodes, is characterized in that the dielectric layers contain a primary component constituted by a $CaZrO_3$ compound as well as auxiliary components including Mn, B, Si, and Li; and formed in the dielectric layers are primary phases constituted by the primary component, segregation phases which contain Ca and at least one of the auxiliary components, and secondary phases containing more Zr than the primary component that are formed separately from the segregation phases; wherein the number of secondary phases in a cross-section of each of the dielectric layers sandwiched between the internal electrodes is controlled to 30 or less on average per 10-μm square when those having a diameter of 100 nm or larger are counted.

It was also confirmed that, when the composition of the dielectric layers is expressed by $Ca_xZrO_3$+aMn+bLi+cB+dSi, generation of secondary phases of high Zr content could be particularly suppressed if a is contained by 0.5≤a≤5.0 mol relative to 100 mol of $Ca_xZrO_3$ (where 1.00<x≤1.15) and the relationship of x and (b+c+d) falls within the area (including points on the lines) shown in FIG. 2 (=Table 1).

Furthermore, it was confirmed that, as long as the amount of Mg contained as impurity in the dielectric layers is one-half or less the content of Si in mol ratio, at least some of Mg would exist locally with Si in parts of the segregation phases and therefore drop in longevity traits would be suppressed.

DESCRIPTION OF THE SYMBOLS

1: Laminated ceramic capacitor, 2: Dielectric layer, 3: Internal electrode layer, 4: External electrode, 7: Primary component phase, 8: Segregation phase (location appearing dark), 9: Secondary phase (location appearing bright)

What is claimed is:

1. A laminated ceramic capacitor having multiple dielectric layers, internal electrodes which are embedded between the dielectric layers and whose primary component is Cu, and external electrodes which are electrically connected to one end of each of the internal electrodes, said laminated ceramic capacitor characterized in that the dielectric layers contain a primary component constituted by a $CaZrO_3$ compound as well as auxiliary components including Mn, B, Si, and Li; formed in the dielectric layers are a primary phase constituted by the primary component, segregation phases which contain Ca and at least one of the auxiliary components, and secondary phases which contain at least Ca and Zr; a ratio of Ca to Zr in the secondary phases is smaller than a ratio of Ca to Zr in the primary phase; and there are no more than 30 secondary phases on average per 10-μm square in a cross-section of each of the dielectric layers sandwiched between the internal electrodes when those having a diameter of 100 nm or larger are counted.

2. A laminated ceramic capacitor according to claim 1, characterized in that the primary component of the dielectric layers, constituted by a $CaZrO_3$ compound, is $Ca_xZrO_3$ and, when a composition of the dielectric layers is expressed by $Ca_xZrO_3$+aMn+bLi+cB+dSi (a to d indicate mol ratios relative to 100 mol of $Ca_xZrO_3$), a is contained by 0.5≤a≤5.0 mol relative to 100 mol of $Ca_xZrO_3$ (where 1.00<x≤1.15) and a relationship of x and (b+c+d) falls within a square area enclosed by A-B-C-D below (including points on lines) where x represents a vertical axis and (b+c+d) represents a horizontal axis; A: (x, b+c+d)=(1.00, 6), B: (x, b+c+d)=(1.06, 15), C: (x, b+c+d)=(1.16, 15), and D: (x, b+c+d)=(1.01, 6).

3. A laminated ceramic capacitor according to claim 1, characterized in that, if Mg is contained as impurity in the dielectric layers, a content of Mg is one-half or less a content of Si in mol ratio.

4. A laminated ceramic capacitor according to claim 3, characterized in that at least some of the Mg contained as impurity in the dielectric layers exists locally with Si in parts of the segregation phases.

5. A method of manufacturing a laminated ceramic capacitor according to claim 1, said manufacturing method characterized by comprising, in this order: a step to prepare a ceramic material that contains a primary component material being a CaZrO$_3$ compound as well as at least Mn, B, Si, and Li as auxiliary component materials in a form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; a sintering step to sinter the chip laminate obtained in the cutting step, in a reducing ambience of 1080° C. or below in temperature, to obtain a sintered compact; and an external electrode-forming step to apply a conductive external electrode paste on both ends of the sintered compact in a manner electrically connecting to the internal electrodes, followed by baking; wherein the ceramic material is kept free of CaCO$_3$ in the material preparation step.

6. A method of manufacturing a laminated ceramic capacitor according to claim 1, said manufacturing method characterized by comprising, in this order: a step to prepare a ceramic material that contains a primary component material being a CaZrO$_3$ compound as well as at least Mn, B, Si, and Li as auxiliary component materials in a form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; an external electrode-forming step to apply a conductive external electrode paste on both ends of the chip laminate obtained in the cutting step, in a manner electrically connecting to the internal electrodes; and a sintering step to sinter the chip laminate obtained in the external electrode-forming step, in a reducing ambience of 1080° C. or below in temperature; wherein the ceramic material is kept free of CaCO$_3$ in the material preparation step.

7. A laminated ceramic capacitor according to claim 2, characterized in that, if Mg is contained as impurity in the dielectric layers, a content of Mg is one-half or less a content of Si in mol ratio.

8. A laminated ceramic capacitor according to claim 7, characterized in that at least some of the Mg contained as impurity in the dielectric layers exists locally with Si in parts of the segregation phases.

9. A method of manufacturing a laminated ceramic capacitor according to claim 2, said manufacturing method characterized by comprising, in this order: a step to prepare a ceramic material that contains a primary component material being a CaZrO$_3$ compound as well as at least Mn, B, Si, and Li as auxiliary component materials in a form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; a sintering step to sinter the chip laminate obtained in the cutting step, in a reducing ambience of 1080° C. or below in temperature, to obtain a sintered compact; and an external electrode-forming step to apply a conductive external electrode paste on both ends of the sintered compact in a manner electrically connecting to the internal electrodes, followed by baking; wherein the ceramic material is kept free of CaCO$_3$ in the material preparation step.

10. A method of manufacturing a laminated ceramic capacitor according to claim 3, said manufacturing method characterized by comprising, in this order: a step to prepare a ceramic material that contains a primary component material being a CaZrO$_3$ compound as well as at least Mn, B, Si, and Li as auxiliary component materials in a form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; a sintering step to sinter the chip laminate obtained in the cutting step, in a reducing ambience of 1080° C. or below in temperature, to obtain a sintered compact; and an external electrode-forming step to apply a conductive external electrode paste on both ends of the sintered compact in a manner electrically connecting to the internal electrodes, followed by baking; wherein the ceramic material is kept free of CaCO$_3$ in the material preparation step.

11. A method of manufacturing a laminated ceramic capacitor according to claim 4, said manufacturing method characterized by comprising, in this order: a step to prepare a ceramic material that contains a primary component material being a CaZrO$_3$ compound as well as at least Mn, B, Si, and Li as auxiliary component materials in a form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; a sintering step to sinter the chip laminate obtained in the cutting step, in a reducing ambience of 1080° C. or below in temperature, to obtain a sintered compact; and an external electrode-forming step to apply a conductive external electrode paste on both ends of the sintered compact in a manner electrically connecting to the internal electrodes, followed by baking; wherein the ceramic material is kept free of CaCO$_3$ in the material preparation step.

12. A method of manufacturing a laminated ceramic capacitor according to claim 2, said manufacturing method characterized by comprising, in this order: a step to prepare a ceramic material that contains a primary component material being a CaZrO$_3$ compound as well as at least Mn, B, Si, and Li as auxiliary component materials in a form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; an external electrode-forming step to apply a conductive external electrode paste on both ends of the chip laminate obtained in the cutting step, in a manner electrically connecting to the internal electrodes; and a sintering step to sinter the chip laminate obtained in the external electrode-forming step, in a reducing ambience of 1080° C. or below in temperature; wherein the ceramic material is kept free of CaCO$_3$ in the material preparation step.

13. A method of manufacturing a laminated ceramic capacitor according to claim 3, said manufacturing method characterized by comprising, in this order: a step to prepare a ceramic material that contains a primary component material being a CaZrO$_3$ compound as well as at least Mn, B, Si, and Li as auxiliary component materials in a form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; an external electrode-forming step to apply a conductive external electrode paste on both ends of the chip laminate obtained in the cutting step, in a manner electrically connecting to the internal electrodes; and a sintering step to sinter the chip laminate obtained in the external electrode-forming step, in a reducing ambience of 1080° C. or below in temperature; wherein the ceramic material is kept free of CaCO$_3$ in the material preparation step.

14. A method of manufacturing a laminated ceramic capacitor according to claim 4, said manufacturing method characterized by comprising, in this order: a step to prepare a ceramic material that contains a primary component material being a CaZrO$_3$ compound as well as at least Mn, B, Si, and Li as auxiliary component materials in a form of oxide, glass, or other compound; a sheet-forming step to form ceramic green sheets using the ceramic material; a printing step to print the ceramic green sheets with internal electrode patterns whose primary component is Cu; a lamination step to laminate the ceramic green sheets completing the printing step to form a laminate; a cutting step to cut the laminate to each internal electrode pattern to obtain a chip laminate; an external electrode-forming step to apply a conductive external electrode paste on both ends of the chip laminate obtained in the cutting step, in a manner electrically connecting to the internal electrodes; and a sintering step to sinter the chip laminate obtained in the external electrode-forming step, in a reducing ambience of 1080° C. or below in temperature; wherein the ceramic material is kept free of CaCO$_3$ in the material preparation step.

15. A laminated ceramic capacitor according to claim 1, wherein the dielectric layers are free of CaCO$_3$.

16. A laminated ceramic capacitor according to claim 1, wherein the primary phase, segregation phases, and secondary phases are observed as different phases wherein the segregation phases and secondary phases are embedded in the primary phase.

17. A laminated ceramic capacitor according to claim 1, wherein the multiple dielectric layers and internal electrodes are simultaneously sintered.

\* \* \* \* \*